US011775571B2

(12) United States Patent
Mathison

(10) Patent No.: US 11,775,571 B2
(45) Date of Patent: *Oct. 3, 2023

(54) GRAPHICALLY REPRESENTING RELATED RECORD FAMILIES USING A PHANTOM PARENT NODE

(71) Applicant: Kilpatrick Townsend & Stockton LLP, Atlanta, GA (US)

(72) Inventor: Mark P. Mathison, Walnut Creek, CA (US)

(73) Assignee: Kilpatrick Townsend & Stockton LLP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,839

(22) Filed: Nov. 23, 2021

(65) Prior Publication Data

US 2022/0083574 A1 Mar. 17, 2022

Related U.S. Application Data

(63) Continuation of application No. 16/054,822, filed on Aug. 3, 2018, now Pat. No. 11,222,050.

(51) Int. Cl.
*G06F 16/31* (2019.01)
*G06F 16/34* (2019.01)
*G06F 16/93* (2019.01)

(52) U.S. Cl.
CPC .......... *G06F 16/322* (2019.01); *G06F 16/328* (2019.01); *G06F 16/34* (2019.01); *G06F 16/93* (2019.01)

(58) Field of Classification Search
CPC ........ G06F 16/322; G06F 16/93; G06F 16/34; G06F 16/328
See application file for complete search history.

(56) References Cited

U.S. PATENT DOCUMENTS 7,657,547 B1 * 2/2010 Huitema ............... G06F 16/248
707/791
10,116,861 B1 10/2018 Graham et al.
(Continued)

OTHER PUBLICATIONS

U.S. Appl. No. 16/054,836, "Notice of Allowance", dated Mar. 18, 2022, 7 pages.
(Continued)

*Primary Examiner* — Vaishali Shah
(74) *Attorney, Agent, or Firm* — Kilpatrick Townsend & Stockton LLP

(57) ABSTRACT

Embodiments use a phantom apex node to graphically illustrate a plurality of hierarchical records. Each record includes a parent field, and an entry in the parent field identifies a parent record of a given record. The parent record is higher in hierarchy than the given record. Embodiments identify record(s) that have no entry in the parent field. A phantom apex record is added to the database. A reference to the phantom apex record is inserted for each record that did not have an entry in the parent field. An x-y coordinate position is determined for all hierarchical records based on the parent field in each record. Once the positions are determined, all references to the phantom apex record are removed from all of the parent fields, and the phantom apex record itself is removed from the database. The plurality of records are then graphically rendered on a target output medium.

20 Claims, 12 Drawing Sheets

(56) References Cited

U.S. PATENT DOCUMENTS

| | | | |
|---|---|---|---|
| 11,222,050 B2 | 1/2022 | Mathison | |
| 11,226,996 B2 | 1/2022 | Mathison et al. | |
| 2003/0050925 A1* | 3/2003 | Moskovich | G06F 16/322 |
| 2003/0120655 A1 | 6/2003 | Ohwada et al. | |
| 2005/0114302 A1 | 5/2005 | Lee et al. | |
| 2005/0182773 A1 | 8/2005 | Feinsmith | |
| 2006/0259857 A1* | 11/2006 | Atkins | G06T 11/60 |
| | | | 715/235 |
| 2012/0072470 A1* | 3/2012 | Joseph | G06F 16/24552 |
| | | | 711/143 |
| 2013/0086070 A1 | 4/2013 | Lundberg | |
| 2014/0032557 A1 | 1/2014 | Bayliss | |
| 2015/0248502 A1 | 9/2015 | Rath et al. | |
| 2015/0278273 A1* | 10/2015 | Wigington | G06F 16/904 |
| | | | 707/797 |
| 2015/0293959 A1 | 10/2015 | Jackson, Jr. | |
| 2017/0242921 A1* | 8/2017 | Rota | G06F 16/353 |
| 2018/0307737 A1* | 10/2018 | Xie | G06F 16/275 |
| 2020/0042638 A1 | 2/2020 | Mathison | |
| 2020/0042639 A1 | 2/2020 | Mathison et al. | |
| 2020/0042640 A1 | 2/2020 | Mathison | |

OTHER PUBLICATIONS

U.S. Appl. No. 16/054,836 , "Non-Final Office Action", dated Dec. 6, 2021, 27 pages.

U.S. Appl. No. 16/054,822 , "Final Office Action", dated Dec. 9, 2020, 20 pages.

U.S. Appl. No. 16/054,822 , "Non-Final Office Action", dated Jun. 24, 2020, 26 pages.

U.S. Appl. No. 16/054,822 , "Notice of Allowance", dated Aug. 25, 2021, 15 pages.

U.S. Appl. No. 16/054,829 , "Final Office Action", dated Dec. 11, 2020, 19 pages.

U.S. Appl. No. 16/054,829 , "Non-Final Office Action", dated Jun. 24, 2020, 26 pages.

U.S. Appl. No. 16/054,829 , "Notice of Allowance", dated Sep. 1, 2021, 15 pages.

U.S. Appl. No. 16/054,836 , "Final Office Action", dated Nov. 4, 2020, 21 pages.

U.S. Appl. No. 16/054,836 , "Non-Final Office Action", dated Mar. 19, 2020, 16 pages.

Walker II , "A Node-Positioning Algorithm for General Trees", Software—Practice & Experience, Sep. 1989, 32 pages.

U.S. Appl. No. 17/540,077 , "Non-Final Office Action", dated Dec. 22, 2022, 30 pages.

U.S. Appl. No. 17/842,670 , "Non-Final Office Action", dated Feb. 15, 2023, 9 pages.

* cited by examiner

460

```
┌─────────────────────────────────────────────────────────────┐
│  Adding a phantom apex record to a plurality of hierarchical │
│                  records stored at a database                │
│                            S462                              │
└─────────────────────────────────────────────────────────────┘
                              │
┌─────────────────────────────────────────────────────────────┐
│ Identifying records that do not contain any entry in the    │
│      parent field among two sets of associated records      │
│                            S464                              │
└─────────────────────────────────────────────────────────────┘
                              │
┌─────────────────────────────────────────────────────────────┐
│   Modifying the identified records to add a reference to    │
│ the phantom apex record in the parent fields of the         │
│                    identified records                        │
│                            S466                              │
└─────────────────────────────────────────────────────────────┘
                              │
┌─────────────────────────────────────────────────────────────┐
│  Determining a position for each of the nodes of the first  │
│    set of records based on the phantom parent (apex) record │
│                            S468                              │
└─────────────────────────────────────────────────────────────┘
                              │
┌─────────────────────────────────────────────────────────────┐
│ Determining a position for each of the nodes of the second  │
│   set of records based on at least the phantom parent       │
│         (apex) record thereby forming a graphical tree      │
│                            S470                              │
└─────────────────────────────────────────────────────────────┘
                              │
┌─────────────────────────────────────────────────────────────┐
│  Deleting all references to the phantom parent record from  │
│  the parent fields of all records and deleting the phantom  │
│            parent record from the database                  │
│                            S472                              │
└─────────────────────────────────────────────────────────────┘
                              │
┌─────────────────────────────────────────────────────────────┐
│       Rendering the graphical tree on a target output       │
│                           medium                             │
│                            S474                              │
└─────────────────────────────────────────────────────────────┘
```

Accessing a plurality of hierarchical records stored at a database
S562

Identifying a child record having one or more parent fields identifying a first parent record and a second record parent
S564

Determining a first position for the child record and a second position for the first parent record without considering the second parent record
S566

Determining a third position for the second parent record at a same level as the position of the first parent
S568

Rendering a first shape, a second shape and a third shape at the first position, the second position and the third position, respectively
S570

Visually connecting the first shape with the second shape and the third shape thereby generating a graphical tree on a target output medium
S572

FIG. 5C

GRAPHICALLY REPRESENTING RELATED RECORD FAMILIES USING A PHANTOM PARENT NODE

CROSS REFERENCE TO RELATED APPLICATIONS

This application is a continuation of U.S. patent application Ser. No. 16/054,822, entitled GRAPHICALLY REPRESENTING RELATED PATENT FAMILIES USING A PHANTOM PARENT NODE filed Aug. 3, 2018, the disclosure of which is incorporated herein by reference for all purposes.

BACKGROUND

A plurality of hierarchical records may be graphically represented using a graphical tree. graphical trees are a common method of visually representing a hierarchically-organized structure. Each node in the graphical tree may represent a given record among a plurality of hierarchical records, each connection between the nodes may represent a hierarchical relationship between the connected nodes. The graphical tree representations are expected to convey the hierarchical relationship information while conserving a visual aesthetic.

The generation of a graphical tree begins with identifying all nodes and determining the placement (e.g. position) of each node on the display or output page. Previously, many graphical trees have been generated by a human graphic designer. Advancements in computer science resulted in developing node-positioning algorithms that calculate the x and y (e.g. x-y) coordinates for every node of the graphical tree. A rendering routine can then use these coordinates to render the graphical tree. A conventional node-positioning algorithm has a first constraint to generate a drawing that is aesthetically pleasing, and a second constraint to conserve space on the display or output page. Each of these two constraints can be handled straightforwardly by itself, but taking them together poses challenges especially as the number of nodes of the graphical tree increases.

Many conventional computer-generated graphical trees contains irregularities (e.g. failing to correctly position interior nodes). In addition, conventional tree-generating algorithms fail to address all design requirements of a graphical tree (e.g. a child node having multiple parent nodes, relative rendering of two hierarchical families that are affiliated with each other).

Embodiments of the present invention may solve these problems and other problems, individually and collectively.

BRIEF SUMMARY

Embodiments provide methods, systems and mediums for receiving a plurality of hierarchical records, wherein each current record in the plurality of hierarchical records includes a parent field, an entry in the parent field identifies a parent record of the current record, wherein the parent record is higher in hierarchy than the current record; identifying one or more records among the plurality of hierarchical records that have no entry in the parent field; adding a phantom apex record to the plurality of hierarchical records; inserting a reference to the phantom apex record for each of the identified one or more records; determining a position for each of the plurality of hierarchical records based on the parent field in each record; deleting all references to the phantom apex record in all of the parent fields; removing the phantom apex record from the plurality of hierarchical records; rendering a shape at each determined position for the plurality of hierarchical records, wherein each shape represents a unique record among the plurality of hierarchical records; and visually connecting the shapes based on entries in the parent fields thereby graphically illustrating the plurality of hierarchical records on a target output medium.

These and other embodiments are described in further detail below.

BRIEF DESCRIPTION OF THE DRAWINGS

FIG. 4C illustrates a flowchart of steps for generating a graphical tree representing two sets of hierarchical records that are affiliated with each other using a phantom parent (apex) node in the graphical tree, in accordance with embodiments of the present application.

FIG. 5C illustrates a flowchart of steps for generating a graphical tree including a node representing a hierarchical record in a graphical tree to have more than one parent node, in accordance with embodiments of the present application.

DETAILED DESCRIPTION

Figure 1:
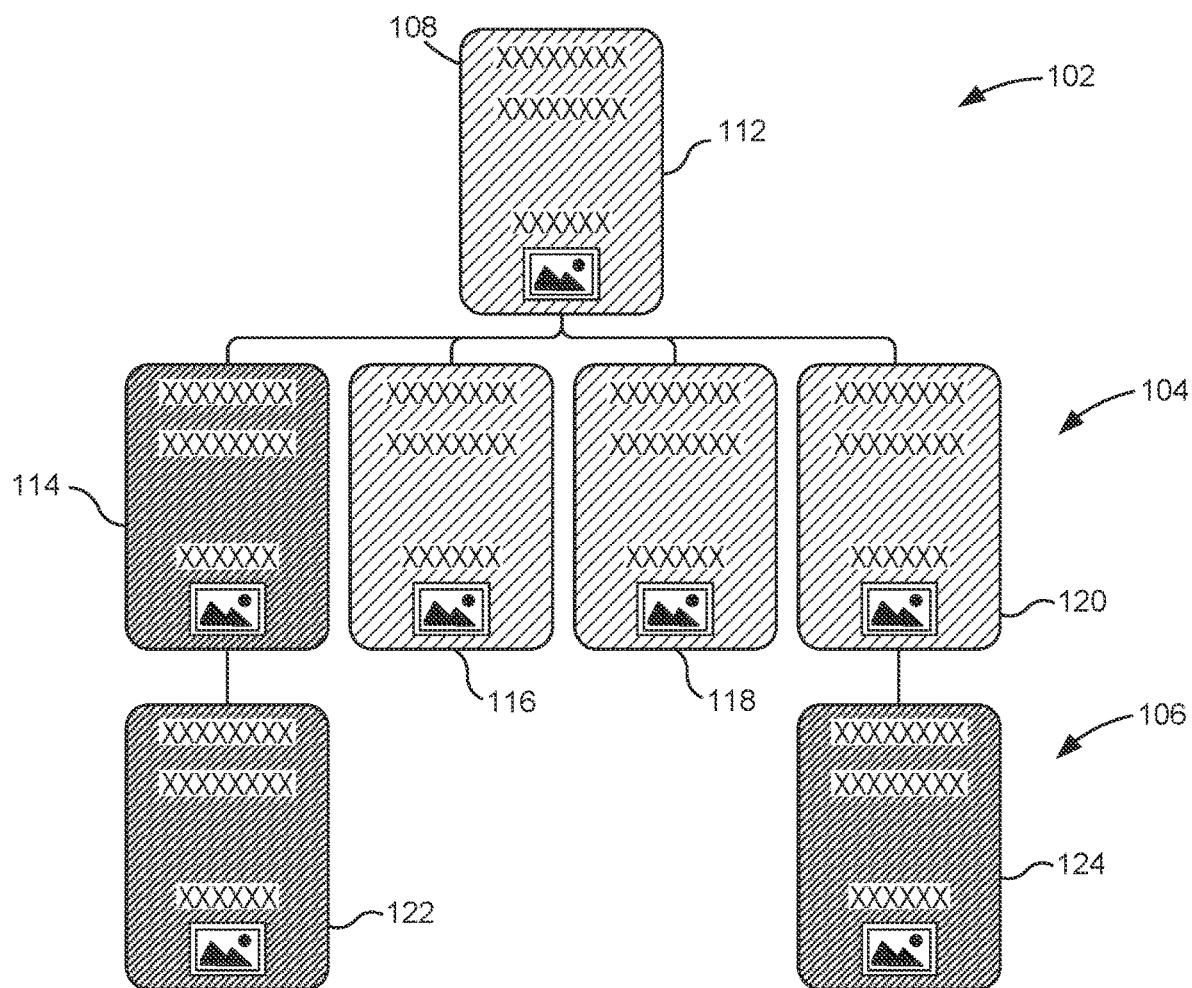
FIG. 1 illustrates an exemplary graphical tree including nodes representing a set of hierarchical records, in accordance with embodiments of the present application.

Embodiments provide methods and systems for generating graphical representation(s) of a plurality of hierarchical records. An exemplary graphical representation (also referred as "a tree" or "a graphical tree") includes at least one parent, and hierarchical connections from the parent to its children. A given node in the graphical tree (e.g. a given record among the plurality of hierarchical records) may have more than one parent. There is no restriction on the number of children each node may have, as there is no restriction on the number of parents a given node may have. That is, a given node can have m parents (where m is 0 or more), and each node can have n children (where n is 0 or more). According to various embodiments, if a node has exactly one child, the child may be positioned directly below its parent node on a target output medium (e.g. a digital display, a paper).

In some embodiments, a phantom apex node may be used to graphically illustrate a plurality of hierarchical records stored, for example, at a database. A graphical tree may be rendered, displayed or otherwise provided on a target output medium (e.g. a display device, paper). Each current record in the plurality of hierarchical records may include a parent field, and an entry in the parent field may identify a parent record of the current record. By definition, the parent record is higher in hierarchy than the current record. Embodiments may identify one or more records among the plurality of hierarchical records that have no entry in the parent field. A phantom apex record may then be added to the database storing the plurality of hierarchical records. Embodiments then insert a reference to the phantom apex record for each of the identified one or more records that did not have an entry in the parent field. Essentially, a record that does not have an entry in the parent field is an apex or a parent record in a set (e.g. family) of records. Embodiments add a phantom parent to existing parents of two or more families of records.

Embodiments may then determine a position for each of the plurality of hierarchical records based on the parent field in each record. Once the positions are determined, all references to the phantom apex record may be removed from all of the parent fields, and the phantom apex record itself may be removed from the database. The plurality of records are then graphically rendered on the target output medium by rendering a shape at each determined position for the plurality of hierarchical records and visually connecting the shapes based on entries in the parent fields. Each shape on the graphical tree represents a unique record among the plurality of hierarchical records.

The generation of graphical trees according to various embodiments may adhere to a set of predetermined rules. The set of rules may include one or more of the following rules:

1. Nodes at the same level of the graphical tree should lie along a straight line, and the straight lines defining the levels should be parallel.

2. A parent should be centered over its offspring.

3. A graphical tree and its mirror image should produce drawings that are reflections of one another.

4. A subtree should be drawn the same way regardless of where it occurs in the graphical tree.

5. Small subtrees should not appear arbitrarily positioned among larger subtrees. Accordingly, small, interior subtrees should be spaced out evenly among larger subtrees (where the larger subtrees are adjacent at one or more levels); and small subtrees at the far left or far right should be adjacent to larger subtrees.

According to various embodiments, subtrees may be built as rigid units. That is, when a node is moved on the graphical tree, all of its descendants (if it has any) are also moved along with the node. The entire subtree is treated as a rigid unit. The graphical tree may be positioned by building the graphical tree up recursively from the leaves (representing children nodes) toward the root (representing the parent node(s)). Embodiments may use two fields for the positioning of each node: a preliminary x-coordinate, and a modifier field. According to various embodiments, a preliminary x-coordinate and a modifier may be assigned to each node, and a final x-coordinate for a given node may be determined by summing the preliminary x-coordinate of the node with the modifier fields of all of ancestors of the node (i.e. all nodes that are higher in the hierarchy than the node). The modifier field associated with the parent (apex) node (i.e. the root of the entire graphical tree) of the graphical tree may be used in determining the final position of all of the descendent nodes (i.e. all nodes that are lower in the hierarchy than the parent node) of the graphical tree.

Sibling nodes (i.e. nodes at the same hierarchical level) may be separated from one another by at least a predefined minimal distance, and adjacent subtrees are separated by at least a predefined subtree separation. Subtrees of a node may be formed independently and placed as close together as the predefined separation values allow.

For a given node, the subtrees are positioned one-by-one, moving, for example, from left to right. A new subtree is placed to the left of an existing neighbor (sibling) subtree while aligning the top node, and moved apart until no two points are touching. Initially the roots of the two neighboring subtrees are separated by the sibling separation value. Then, at the next lower level, the roots are pushed apart until the subtree separation value is established between the adjacent subtrees at the lower level. When this process is complete for all of the offsprings of a node, the node is centered over its leftmost and rightmost offspring.

Embodiments produce graphical trees having evenly distributed, proportional spacing among subtrees. When moving a large subtree to the right, the distance it is moved is also apportioned to smaller, interior subtrees. The moving of these subtrees is accomplished by adding the proportional values to the preliminary x-coordinate and modifier fields of the roots of the small interior subtrees. For example, if three small subtrees are bunched at the left because a new large subtree has been positioned to the right, the first small subtree to shifted right proportionally to the gap (e.g. by ¼ of the gap), the second small subtree is shifted right proportionally to the gap (e.g. by ½ of the gap), and the third small subtree is shifted right proportionally to the gap (e.g. by ¾ of the gap). The second graphical tree traversal determines the final x-coordinate for each node. The second graphical tree traversal starts at the apex node of the graphical tree, summing each node's x-coordinate value with the combined sum of the modifier fields of its ancestors. The second graphical tree traversal also adds a value that guarantees centering of the display with respect to the position of the apex node of the drawing. A final graphical tree is thereby generated. These features are discussed in "A Node-Positioning Algorithm for General Trees" TR89-034, September, 1989 by John Q. Walker II, which is incorporated herein by reference.

Referring now to FIG. 1, a graphical tree 100 will be described next. The graphical tree 100 may be generated to illustrate a first set of hierarchical records among a plurality of hierarchical records stored at a storage device (e.g. a database stored at a server memory). In some embodiments, the database may store a list of records and a hierarchical relationship among the plurality of hierarchical records. When a subset (including a portion or all) of the hierarchical records are graphically represented using the graphical tree 100, each node in the graphical tree 100 represents a unique hierarchical record stored in the database. According to various embodiments, each node may be rendered on a target output medium using a graphical shape (e.g. an icon). The graphical shape may also include alphanumeric characters, symbols and/or graphics to illustrate information associated with the corresponding hierarchical record. For example, the graphical icon may include a record ID assigned to the hierarchical record.

Embodiments may embed a link to a corresponding database entry from the node incorporated in the graphical tree 100. For example, in the graphical tree 100 illustrated in FIG. 1, node 108 represents a unique record stored as a database entry on the database. The node 108 may be graphically selectable/activatable. Selecting and/or activating node 108 by, for example, clicking on the node 108 using a pointing device such a mouse, a stylus pen for touch-screens or user fingertips, the database entry associated with the unique record represented by node 108 may be retrieved from the database, and (optionally) displayed to the user.

Each record in the plurality of hierarchical records may include a parent field. An entry in the parent field identifies a parent record of that record. The parent record is higher in hierarchy than the record. No entry in the parent filed may indicate that the record does not have a parent. According to some embodiments, the first set of hierarchical records may be inter-related in a predetermined manner. For example, the first set of hierarchical records may belong to a family of hierarchical records where the first set of hierarchical records includes a parent record and off-springs of the parent record. For example, a record without a parent record may itself be the first record in a given family of hierarchical records. In some embodiments, the first set of hierarchical records may include more than one parent records, which will be discussed below in greater detail in connection with FIGS. 3A-3B.

The graphical tree 100 illustrated in FIG. 1 includes a parent level (e.g. a first hierarchical level) 102, a first off-spring level (e.g. a second hierarchical level) 104 and a lower second off-spring level (e.g. a third hierarchical level) 106. The third hierarchical level is lower in hierarchy than the second hierarchical level, which is lower in hierarchy than the first hierarchical level. The exemplary graphical tree 100 includes one parent node 112 at the parent level 102. The parent node 112 may represent a parent record among the first set of hierarchical records (e.g. among a first family of hierarchical records). The first off-spring level 104 includes four nodes 114, 116, 118, 120 which are off-springs of the parent node 112. The nodes 114, 116, 118, 120 may each represent a child record of the parent record represented by parent node 112. The nodes 114, 116, 118, 120 may be referred as sibling nodes. The second off-spring level 106 includes two nodes 122, 124 which are off-springs of nodes 114 and 120, respectively. The node 122 represents a child record of the hierarchical record represented by node 114. The node 124 represents a child record of the hierarchical record represented by node 120.

According to various embodiments, visual cues may be added to the graphical tree to illustrate various types of information associated with the hierarchical records. For example, an expired or otherwise closed record may be illustrated using a first color, a record where an action needs to be taken by a predetermined deadline may be illustrated with a second color, etc. In some embodiments, an initial record may have been created in the database, however there may still be outstanding actions that need to be taken in connection with the initial record to transform the initial record to a formal, actual record in the database. Such an initial record may be illustrated using a graphical node having broken lines (such as node 232 in FIG. 2).

Various embodiments may illustrate two or more sets of hierarchical records as affiliated records (e.g. a first set of records is affiliated with a second set of records). As used herein, affiliated records may refer to a relationship among records that are related to each other by a criteria other than ancestry. That is, when a first set of hierarchical records is affiliated with a second set of hierarchical records, no record in the first set of hierarchical records is a parent of any record in the second set of hierarchical records, and no record in the second set of hierarchical records is a parent of any record in the first set of hierarchical records.

Figure 2:
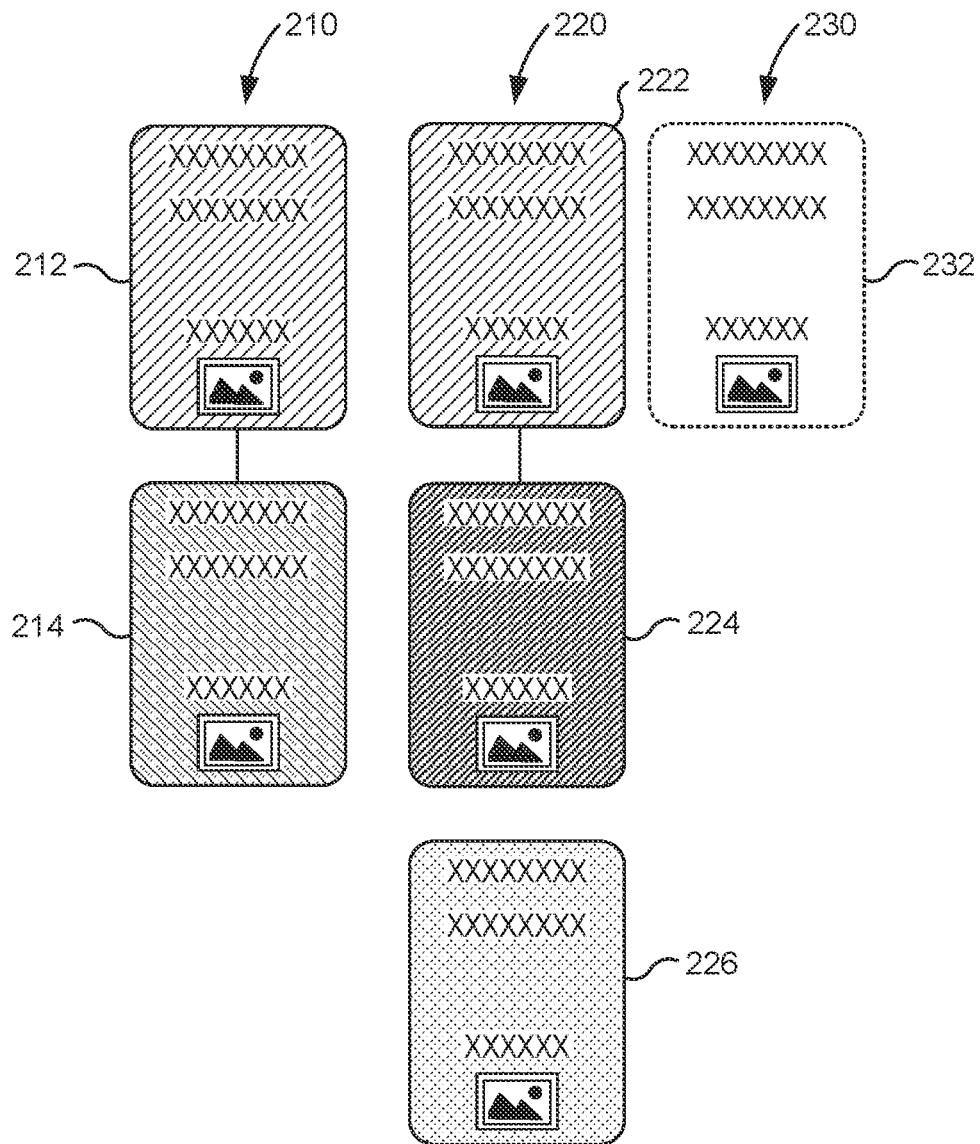
FIG. 2 illustrates an exemplary graphical representation of three sets of affiliated hierarchical records represented by three separate graphical trees, in accordance with embodiments of the present application.

FIG. 2 illustrates an exemplary graphical representation 200 of three sets of affiliate hierarchical records. The first set of hierarchical records represented by a first graphical tree 210 includes a parent record represented by a first node 212 and a child record represented by a second node 214. The second set of hierarchical records represented by a second graphical tree 220 includes a parent record represented by a third node 222, a first child record (represented by a fourth node 224) of the parent record, and a child record (represented by a fifth node 226) of the first child record. The third set of hierarchical records represented by a third graphical tree 230 includes an initial record represented by a sixth node 232. As described above, the initial record is created in the database. However, when there are outstanding actions that need to be taken in connection with the initial record to transform the initial record to a formal, actual, record in the database, the initial record is illustrated using a graphical node having broken lines (e.g. sixth node 232).

As provided above, according to some embodiments, a set of hierarchical records may be referred as a family of records. For example, in FIG. 2, a first family of records may be illustrated with the first graphical tree 210, a second family of records may be illustrated with the first graphical tree 220, and a third family of records may be illustrated with the first graphical tree 230. The first, second and third families may belong to a same group (e.g. the families may be managed and/or owned by a single entity). Accordingly, the ability to display these families together using a single graphical representation 200 may allow for conveying information about these families simultaneously. For example, the ability to display these families together using a single graphical representation 200 may enable the owner/manager entity of these families to get an overview of a current status of these related families of records.

According to various embodiments, generating a graphical tree includes identifying nodes representing the individual hierarchical records and determining an x-y coordinate on a target output medium for each of the plurality of hierarchical records. The target output medium may include a digital screen (e.g. a computer screen, a mobile device screen, a tablet screen) or a paper. The x-y coordinate for each node may be determined following the algorithm described above such that the nodes are evenly spaced on the target output medium. In some embodiments, a user may wish to switch the display medium after the graphical tree is generated. For example, the graphical tree may be rendered on a first digital screen having a first set of dimensions. The user may then with to display the same graphical tree on a second, smaller digital screen having a second set of dimensions smaller than the first set of dimensions. Alternatively, the user may wish to display the graphical tree that is currently displayed on a first window on the first digital screen, to a second, larger window on the first digital screen. Embodiments are able to re-render the graphical tree based on the dimensions of the new target output medium such that the initial rendering and the subsequent rendering of the graphical representations may have a similar layout, resized according to the requirements of the target output medium.

Figure 3A:
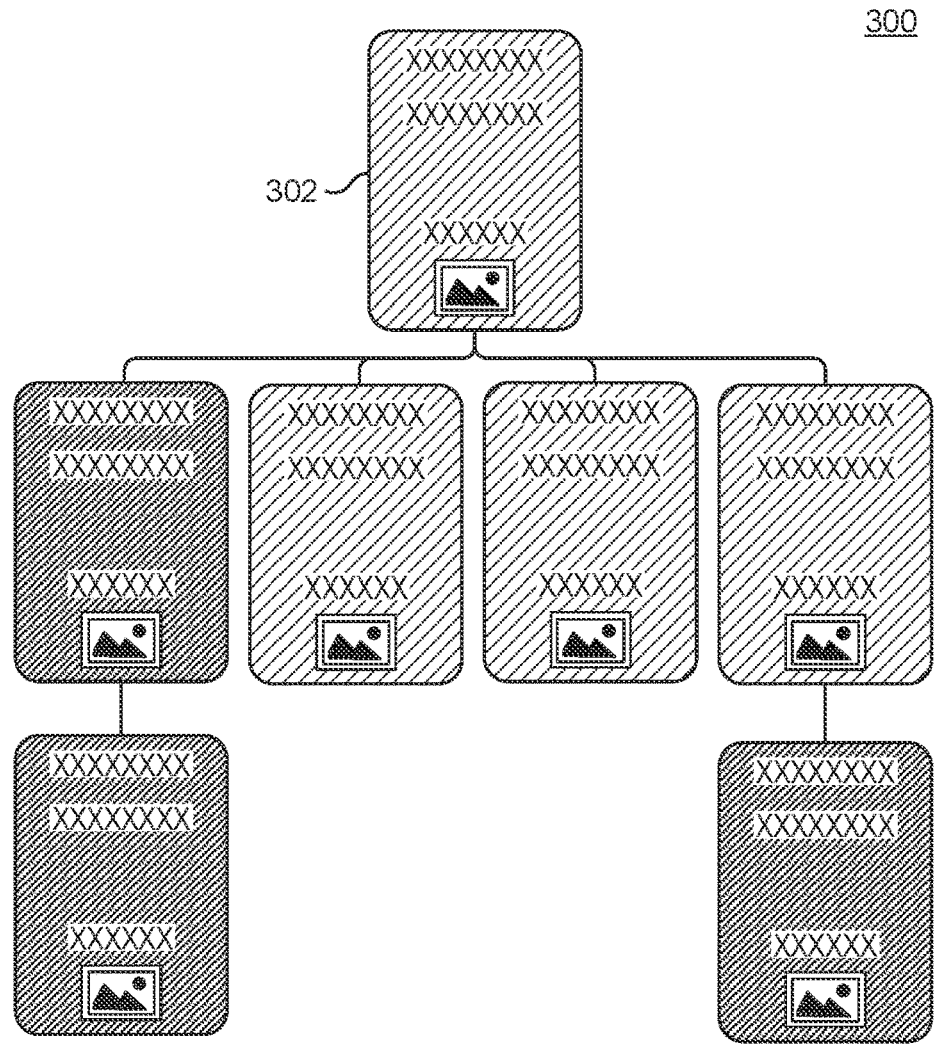
FIG. 3A illustrates an exemplary graphical tree rendered on a first target output medium having a first set of dimensions, in accordance with embodiments of the present application.

As illustrated in FIG. 3A, a first graphical tree 300 may be rendered on a first, larger target output medium. The x-y coordinate for each node of the first graphical tree 300 may be determined based on the dimensions of the first target output medium. The contents 302 of each node of the first graphical tree 300 may include a first set of information represented using one or more of alphanumerical characters, symbols and/or graphics. The first graphical tree 300 may represent a first set of hierarchical records.

Figure 3B:
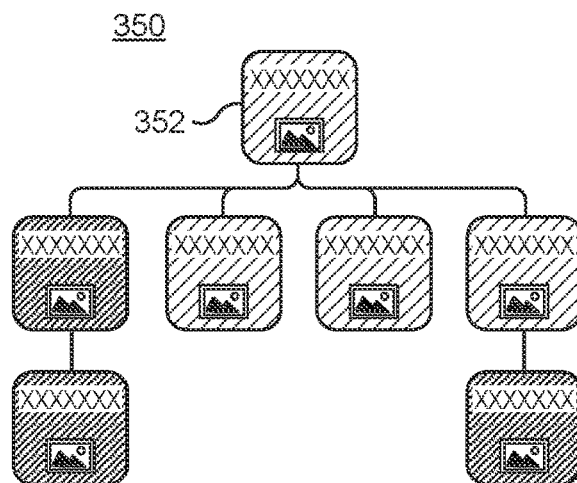
FIG. 3B illustrates the exemplary graphical tree of FIG. 3A rendered on a second target output medium having a second, smaller set of dimensions, in accordance with embodiments of the present application.

The same set of hierarchical records may be represented on a second, smaller target output medium using the second graphical tree 350. As shown in FIG. 3B, the second graphical tree 350 has a similar overall shape as the first graphical tree 300. Since the second graphical tree 350 is rendered on a smaller target output medium, the contents 352 of each node of the second graphical tree 350 may include a second set of information that is less than the first set of information. The second set of information may also be represented using one or more of alphanumerical characters, symbols and/or graphics. As such, the position (x-y coordinates) for a given record among the plurality of hierarchical records on a first target output medium having a first set of dimensions is different than the position (x-y coordinates) for the given record on a second target output medium having a second, different set of dimensions.

Phantom Parent/Apex Node

When generating a graphical tree representing two sets of hierarchical records that are affiliated with each other, embodiments allow for aligning the nodes at a given level in both sets of hierarchical records. This is accomplished by using a phantom parent (apex) node in the graphical tree.

Figure 4A:
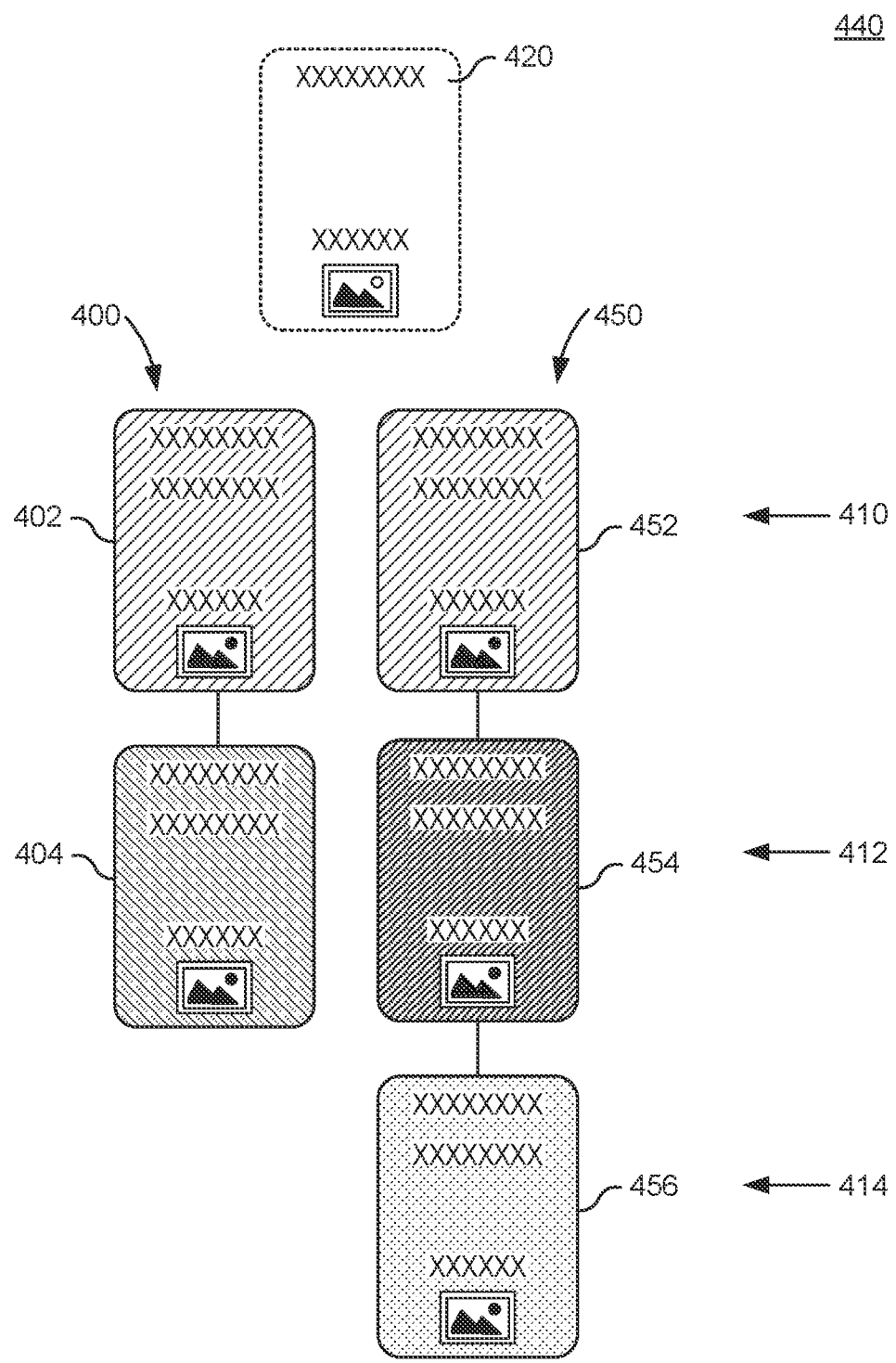
FIG. 4A illustrates an exemplary phantom parent (apex) node for rendering a graphical tree representing two sets of hierarchical records that are affiliated with each other, in accordance with embodiments of the present application.

As shown in FIG. 4A, a first set of hierarchical records 400 and the second set of hierarchical records 450 are illustrated using a graphical tree 440. The first set of hierarchical records 400 are stored on the database as being affiliated with the second set of hierarchical records 450. As provided above, affiliate or affiliated records refer to a relationship among records that are related to each other by a criteria other than ancestry. That is, no record in the first set of hierarchical records 400 is a parent of any record in the second set of hierarchical records 450, and no record in the second set of hierarchical records 450 is a parent of any record in the first set of hierarchical records 400. The graphical tree 440 illustrated in FIG. 4A includes three hierarchical levels: a first hierarchical level 410, a second hierarchical level 412 and a third hierarchical level 414.

The first set of hierarchical records 400 includes a first node 402 at the first hierarchical level 410. The first node 402 is the parent (apex) node representing the parent record in the first set of hierarchical records 400. Accordingly, the parent field of the hierarchical record represented by the first node 402 does not have an entry in its parent field. The second set of hierarchical records 450 includes a second node 452 at the first hierarchical level 410. The second node 452 is the parent (apex) node representing the parent record in the second set of hierarchical records 452. Accordingly, the parent field of the hierarchical record represented by the first node 452 does not have an entry in its parent field. As shown in FIG. 4A, the first node 402 and the second node 452 (i.e. the parent node of the first set of hierarchical records 400 and the parent node of the second set of hierarchical records 450) are aligned on the graphical tree 440. Similarly, the first set of hierarchical records 400 includes a third node 404 at the second hierarchical level 412. The third node 404 is the child (descendent) node of the parent node 402 representing the parent record of the first set of hierarchical records 400. The second set of hierarchical records 450 includes a fourth node 454 at the second hierarchical level 412. The fourth node 454 is the child (descendent) node of the parent node 452 representing the parent record of the second set of hierarchical records 450. As shown in FIG. 4A, the third node 404 and the fourth node 454 are aligned on the graphical tree 440. In addition, the second set of hierarchical records 450 includes a fifth node 456 at the third hierarchical level 414. The fifth node 456 is the child (descendent) node of the child node 454 of the second set of hierarchical records 450. As shown in FIG. 4A, since there are no corresponding entries at the third level 414 in the first set of graphical records, only fifth node 456 is displayed at the third level 414.

The alignment of nodes in a given hierarchical level of affiliate sets of records is accomplished by using a phantom parent (apex) node 420 that acts as a pseudo apex for both the first set of hierarchical records 400 and the second set of hierarchical records 450. Accordingly, the phantom parent (apex) node 420 becomes the pseudo-parent node of the parent node 402 of the first set of hierarchical records 400 and the pseudo-parent node of the parent node 452 of the second set of hierarchical records 450.

FIG. 4C illustrates a flowchart 460 of steps for generating a graphical tree representing two sets of hierarchical records that are affiliated with each other using a phantom parent (apex) node in the graphical tree. Given a plurality of hierarchical records stored at a database, a phantom apex record is added to the plurality of hierarchical records at a step S462. That is, an entry for the phantom apex record is generated in the database. As provided above, initially, the parent field of both the hierarchical record represented by the parent node 402 and the hierarchical record represented by the parent node 452 did not contain any entries. The nodes 402 and 452 are identified at step S464, and the parent fields of these records are modified to insert an entry identifying the phantom parent (apex) record at step S466. Then, a position for the each of the nodes 402 and 404 is determined based on the phantom parent (apex) record at step S468. Similarly, a position for each of the nodes 452, 454 and 456 is determined based on at least the phantom parent (apex) record at step S470. The graphical tree 442 representing the two affiliated sets of graphical records is thereby generated.

Figure 4B:
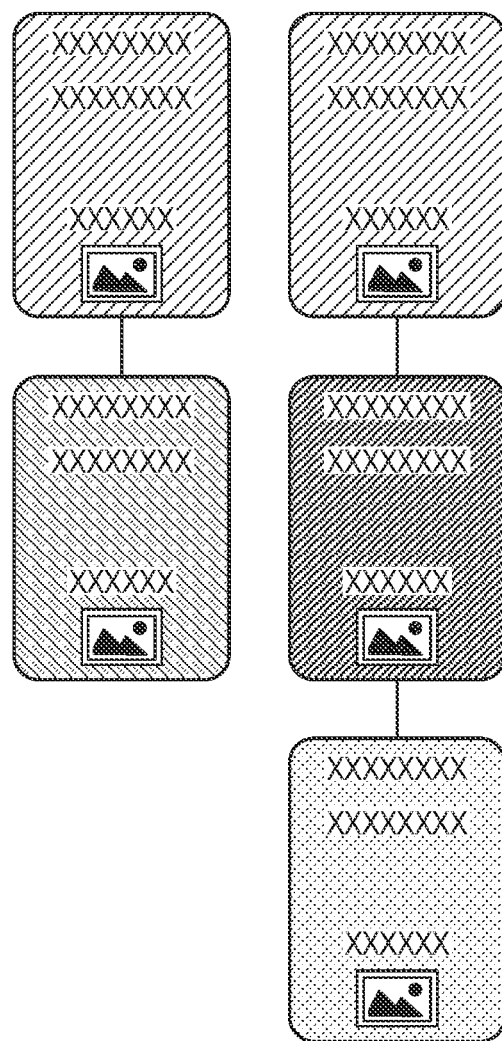
FIG. 4B illustrates the graphical tree of FIG. 4A where the exemplary phantom parent (apex) node is removed, in accordance with embodiments of the present application.

Once the positions of all nodes are determined, all references to the phantom apex record are deleted from all of the parent fields, and the phantom apex record is removed from the plurality of hierarchical records at step S472. The phantom parent (apex) node 420 illustrated in FIG. 4A is shown for illustrative purposes only. According to various embodiments, the phantom parent (apex) node 420 is not added to the graphical tree representing the affiliate sets of graphical records. That is, as shown in FIG. 4B, the phantom parent (apex) node 420 is not a part of the graphical tree 442. According to various embodiments, a fixed distance may be added or subtracted from each of the positions in order to move a graphical representation of the plurality of hierarchical records over where the phantom apex node 420 would have been rendered, such that the nodes at the first hierarchical level 410 (e.g. nodes 402 and 452 at FIG. 4A) will be aligned with each other, and centered below the phantom apex node 420.

At step S474, the graphical tree 442 is rendered on the target output medium by rendering a shape representing a unique record at each determined position for the plurality of hierarchical records. The shapes are then visually connecting (e.g. by using a line) based on entries in the parent fields. As shown in FIG. 4B, the first set of hierarchical records 400 and the second set of hierarchical records 450 are rendered as sibling groups of hierarchical records.

Graphically Representing Multiple Parents Claims

Embodiments further allow a node representing a hierarchical record in a graphical tree to have more than one parent node. In some embodiments, a child record among the plurality of hierarchical records may have one or more parent fields identifying a first parent record and a second parent record of the child record.

Figure 5A:
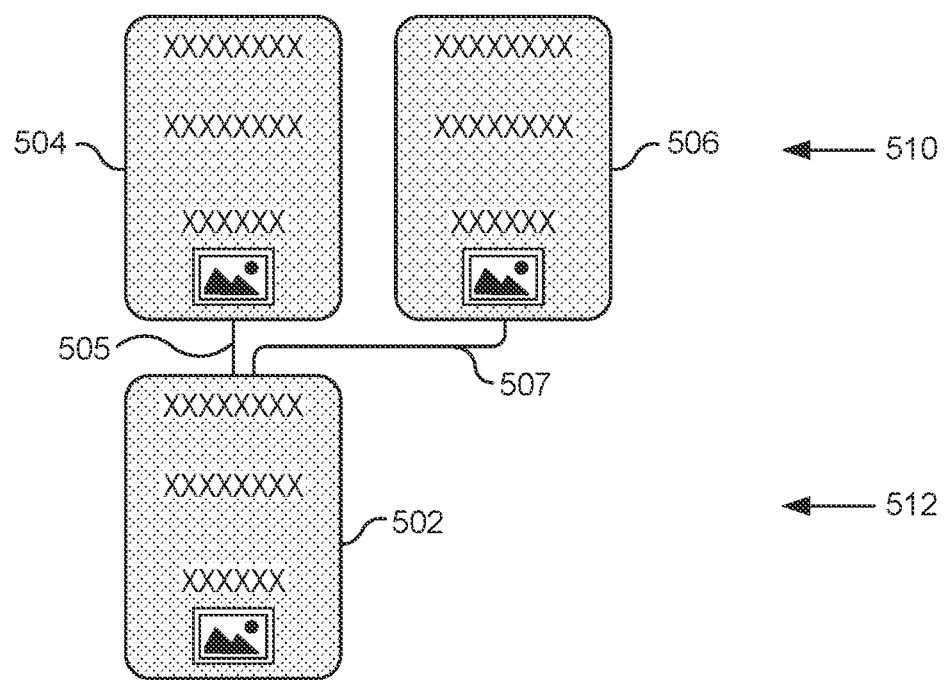
FIG. 5A illustrates a first exemplary graphical tree including a node having more than one parent node, in accordance with embodiments of the present application.

Referring to FIG. 5A, the graphical tree 500 illustrates an exemplary child record represented by a child node 502 that has a first parent record represented by a first parent node 504 and a second parent record represented by a second parent node 506. When determining the positions of respective nodes 502, 504, 506 on the target output medium, a first position (i.e. x-y coordinate) for the child node 502 and a second position for the first parent node 504 may be determined without considering the second parent node 506. The first parent node 504 (e.g. the second position) is provided at a first, higher hierarchical level 510 and the child node 502 provided at a second, lower hierarchical level 512 on the target output medium.

At a subsequent step, a third position for the second parent node 506 may be determined at a same hierarchical level (i.e. the first, higher hierarchical level 510) as the first parent node 504. Embodiments then render a first shape (e.g. child node 502) at the first position, a second shape (e.g. first parent node 504) at the second position and a third shape (e.g. second parent node 506) at the third position. The first shape is then visually connected with the second shape and the third shape to form the graphical tree 500 that graphically illustrates the plurality of hierarchical records on the target output medium.

According to various embodiments, visually connecting the shapes may include drawing a first line 505 between the first shape and the second shape, and drawing a second line 507 between the first shape and the third shape, without visually connecting the second shape and the third shape. As illustrated in FIG. 5A, the first parent node 504 is rendered at a sibling level of the second parent node 506 such that the first parent record is represented as a sibling of the second parent record.

Figure 5B:
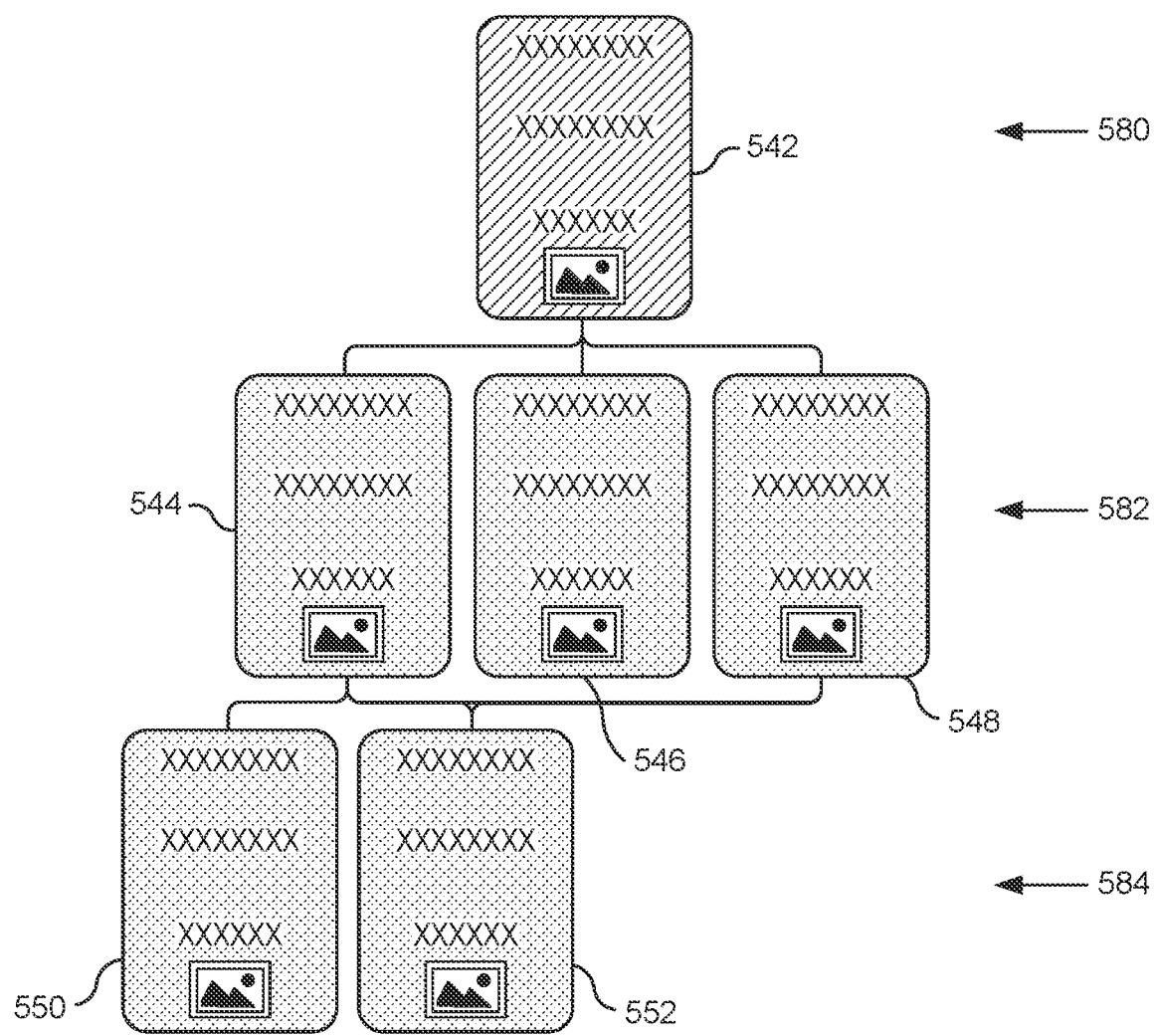
FIG. 5B illustrates a second exemplary graphical tree including a node having more than one parent node, in accordance with embodiments of the present application.

According to various embodiments, the child record that has more than one parent records may be lower in a hierarchical level than that is illustrated in FIG. 5A. For example, FIG. 5B illustrates a graphical tree 540 having three hierarchical levels: a first hierarchical level 580, a second hierarchical level 582 lower than the first hierarchical level 580, and a third hierarchical level 584 lower than the second hierarchical level 582. The child record having multiple parents may be provided at the lower third hierarchical level 584. The graphical tree 540 may include a parent node 542 having three children nodes 544, 546, 548. The child node 544 may have two child nodes 550, 552. The child node 550, as well as the child node 552 may also have the node 548 as their parent. Accordingly, the child node 550 may have node 544 as a first parent node and node 548 as a second parent node. Similarly, the child node 552 may have node 544 as a first parent node and node 548 as a second parent node.

FIG. 5C illustrates a flowchart 560 of steps for generating a graphical tree including a node representing a hierarchical record in a graphical tree to have more than one parent nodes. At step S562, embodiments may access a database storing a plurality of hierarchical records. At step S564, embodiments may identify a child record having one or more parent fields identifying multiple parent records, e.g. a first parent record, and a second parent record. At step S566, a first position for a first node representing the child record and a second position for a second node representing the first parent are determined without considering the second parent record. At step S568, a third position is determined for a third node representing the second parent record is determined to be at a same level as the position of the second node representing the first parent. At step S570, embodiments render a first shape, a second shape and a third shape at the first position, the second position and the third position, respectively. The first shape illustrates the first node, the second shape illustrates the second node and the third shape illustrates the third node. At step S572, the first shape is visually connected with the second shape and the third shape (without connecting the second shape with the third shape) to generate a graphical tree representing the plurality of hierarchical records including a node having more than one parent nodes on a target output medium.

Compare Related Matters Claims

According to various embodiments, a first set of records among the plurality of hierarchical records may be associated with each other. According to various embodiments, the term "associated records" may refer to a set of records where a given record in the set is related to other records in the same set by any type of relation including but not limited to a relationship defined when the records are generated, an association defined by a user, or ancestry (i.e. the given record is a parent, a descendent or a sibling of each of the other records in the same set).

If records in a given set of records are related to each other only by ancestry, that given set of records may be referred as a family of hierarchical records. Accordingly, all records in the same family must identify all remaining records of the same family as their associated records. As provided above, relationship by ancestry is an example of association among records. To ensure this cross-relation, embodiments review associated records to identify if one of the records in the family fails identify a given record in the same family as an associated record. For example, if a family includes 5 records (e.g. records A, B, C, D and E), each record (e.g. record A) must identify the remaining 4 records (e.g. records B, C, D and E) as associated records. If one of records (e.g. record B) identifies less than 4 records (e.g. records A, C, D) as associated records, that record (e.g. record B) will be visually identified in the graphical tree representing the family of 5 records.

Figure 6A:
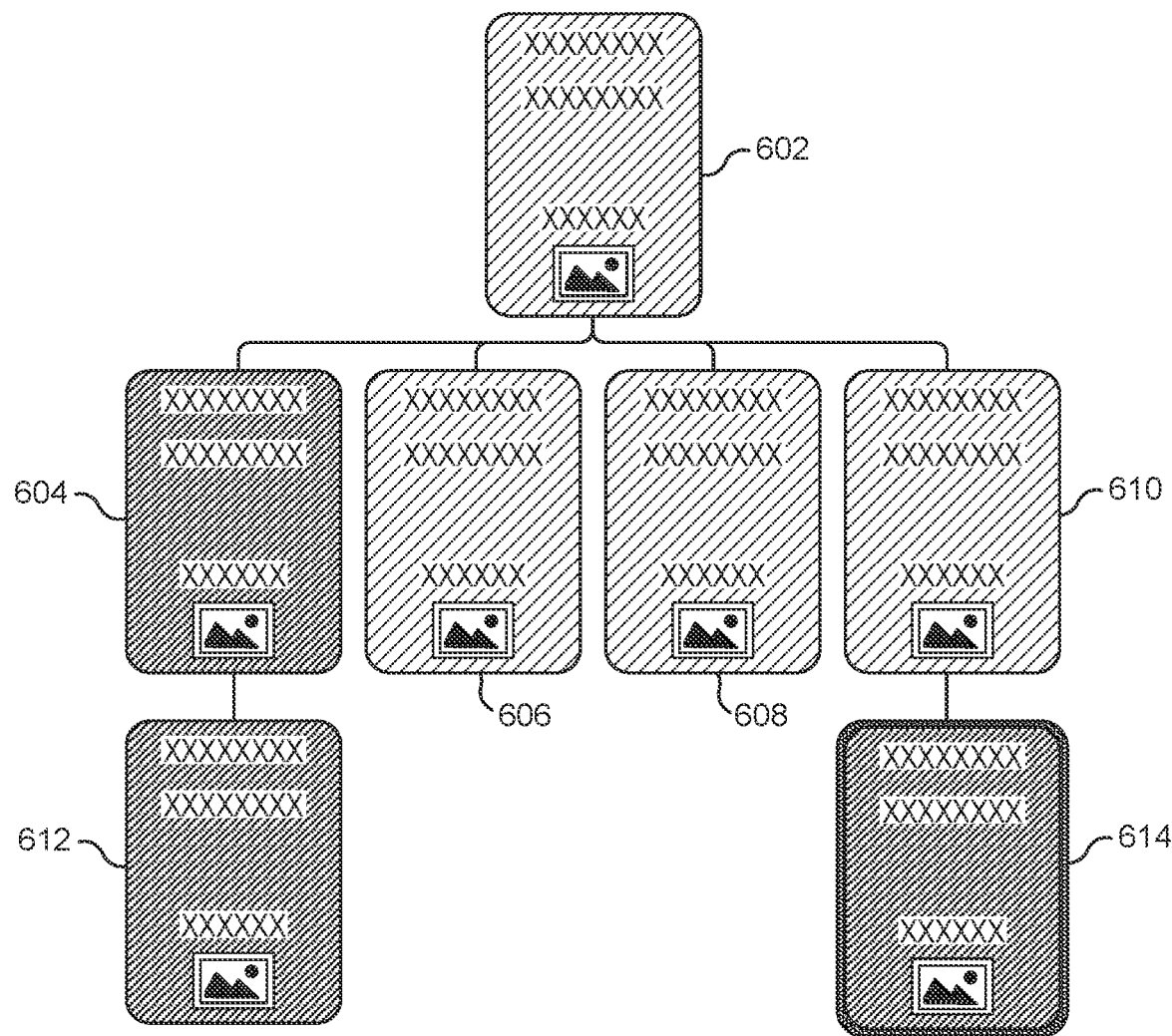
FIG. 6A illustrates a graphical tree representing a family of hierarchical records where one of the nodes is visually identified as including missing associated records information, in accordance with embodiments of the present application.

FIG. 6A shows a graphical tree 600 representing a family of hierarchical records where one of the nodes is visually identified as including missing associated record information. According to various embodiments, a plurality of hierarchical records may be stored at a database. That is, each record may have a database entry providing details about the record. A given database entry may have a parent field and an associated records field for a given record. An entry in the parent field identifies a parent record of the given record. An entry in the associated records field identifies one or more records that are associated with the given record.

For example, in the graphical tree 600 shown in FIG. 6A, the node 604 may correspond to a first record. The first record may include a reference to a parent record represented by node 602 in the parent field, and references to records represented by nodes 606, 608, 610, 612, 614 in the associated records field. Embodiments may ensure for each one of the records represented by nodes 602, 604, 606, 608, 610, 612 and 614 lists the records represented by the remaining of the nodes in the family in their associated records fields. This may be accomplished by traversing the database away from and toward the selected record (e.g. record represented by node 604) to determine a first list of all records that are close or distant relatives (e.g. records represented by nodes 606, 608, 610, 612, 614) of the selected record. According to various embodiments, the first list may be determined based on one or more of the parent field of the selected record, the parent fields of all the records of the family, or associated records fields of all the records of the family.

Embodiments may then determine a second list of records based on the associated records field of the selected record. When the first list and the second list are compared against each other, a missing record (e.g. identified by node 614) may be identified if the missing record appears in the first list but not in the second list. The node representing the missing record (e.g. node 614) may be visually identified on the graphical tree 600. For example the node 614 may be displayed using a predetermined color, a shape that is different than the remainder of the nodes of the same graphical tree, a textured line, shading, highlighting, etc.

Figure 6B:
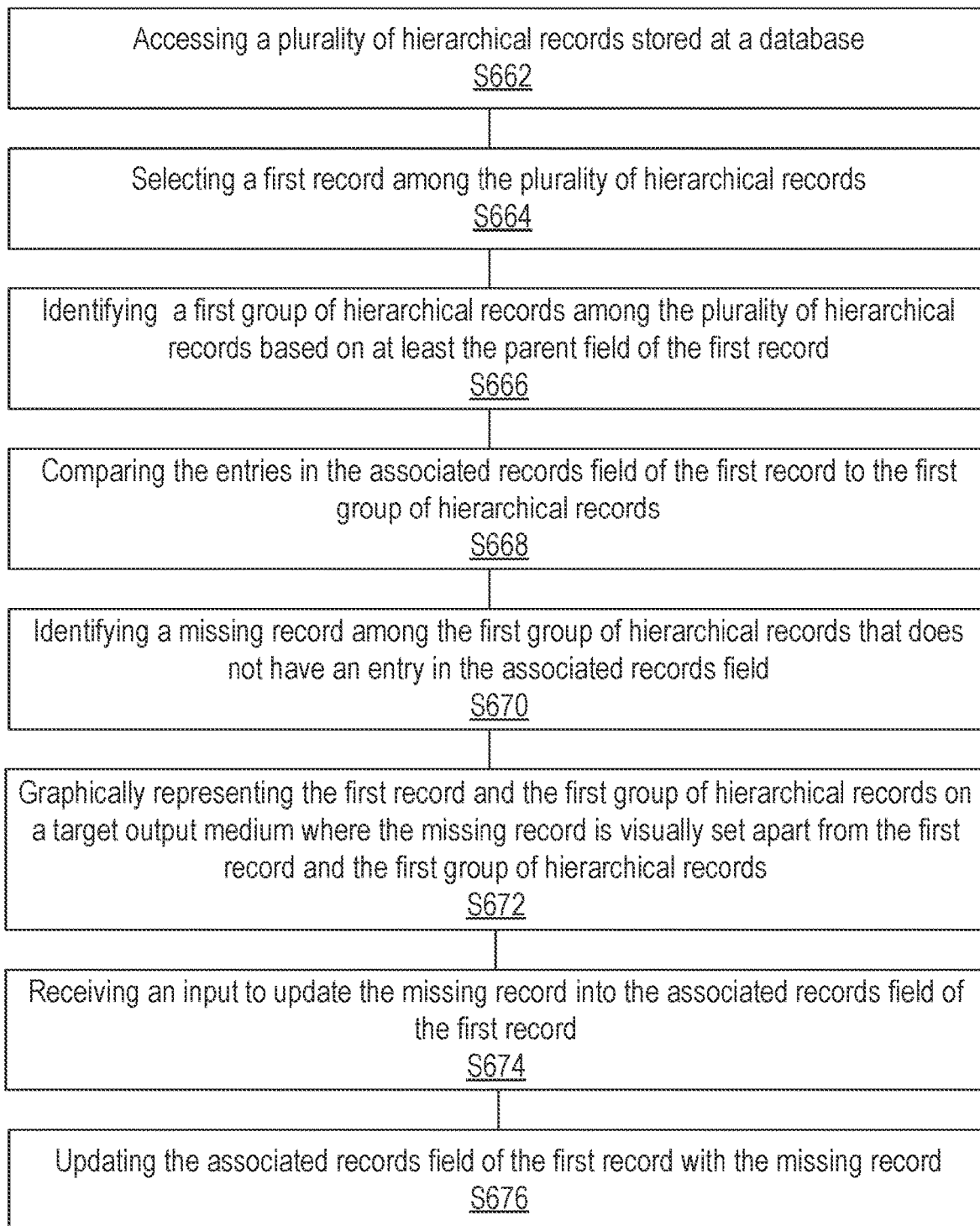
FIG. 6B illustrates a flowchart of steps for generating a graphical tree representing a family of hierarchical records where one of the nodes is visually identified as including missing associated records information, in accordance with embodiments of the present application.

FIG. 6B illustrates a flowchart 660 of steps for generating a graphical tree representing a family of hierarchical records where one of the nodes is visually identified as including missing associated records information. At step S662, embodiments may access a database storing a plurality of hierarchical records. At step S664, embodiments may select (or receive a selection of) a first record among the plurality of hierarchical records. At step S666, embodiments identify a first group of hierarchical records among the plurality of hierarchical records based on at least the parent field of the first record. At step S668, entries in the associated records field of the first record are compared to the first group of hierarchical records. At step S670, a missing record is identified among the first group of hierarchical records that does not have an entry in the associated records field of the first record. At step S672, embodiments graphically represent the first record and the first group of hierarchical records on a target output medium where the missing record is visually set apart from the first record and the first group of hierarchical records.

Once the missing record is identified and visually represented to a user, the user may then provide input to correct the records stored on the database. For example, the user may provide an input to update the missing record into the associated records field of the selected record. Some embodiments may further receive an input to update the missing record into the associated records field of the first record at step S674 and update the associated records field of the first record with the missing record at step S676.

Caching Parent & Child Data

Various embodiments may identify parent record(s) and child record(s) in a given family of records, and may cache this information on a local storage device such that a graphical tree representing the family may be quickly and efficiently rendered on the local device. For example, when a user interacting with the embodiments requests the generation of a graphical tree to represent a first set of hierarchical records, embodiments may access a remote database storing a plurality of hierarchical records to identify, for each record, every child record for a selected record using the parent fields from different records in the database. Embodiments may then store, for each record, every child record in one or more child fields of the selected record on a local database. Similarly, the parent fields for each record are also stored on the local database. Each record in the plurality of records may be associated with a family such that each family is defined by all records that are close or distant relatives of each other in the database (e.g. each family includes records that are related to each other by ancestry). When a user interacting with the local device selects a record, embodiments may render a graphical tree representing the family of the selected record using the stored parent and child fields from the local database.

The various embodiments discussed above may be used to illustrate patent application records. For example, the database may store a plurality of patent application records. As used herein, a patent application or a patent application record may include, but is not limited to, domestic patent applications, domestic patents, foreign patent applications and foreign patents. The visual cues discussed above may be used to illustrate whether a patent application is allowed, pending or expired. The nodes or graphical shapes used to illustrate a corresponding patent application may also display information such as the application number, a docket number, and/or a filing country of the corresponding patent application. A set of patent applications may form a family as they may be inter-related by ancestry. In certain cases, a first non-provisional patent application may claim priority to more than one provisional patent application. Therefore, the first non-provisional patent application may have the more than one provisional patent application as its parent records. In some embodiments two patent families may be affiliated. For example, a first patent family and a second patent family may be directed to similar subject matter without claiming priority to each other. These two affiliated patent families may be graphically illustrated next to each other. In addition, these two affiliated patent families may be listed among the related records fields of each other. In some embodiments, a first patent application in a family may list other patent applications in the same family in associated records field of the first patent application. Embodiments may identify a second patent application in the same family that does not list at least one of the remaining members of the family in an associated records field of the second patent application. The identified second patent application with missing information may be visually identified (e.g. using a different color, a different border) on the graphical tree.

The various participants and elements shown in FIGS. 1-6 may operate one or more computer apparatuses (e.g., a server computer) to facilitate the functions described herein. Any of the elements in FIGS. 1-6 may use any suitable number of subsystems to facilitate the functions described herein. Examples of such subsystems or components are shown in FIG. 7.

Figure 7:
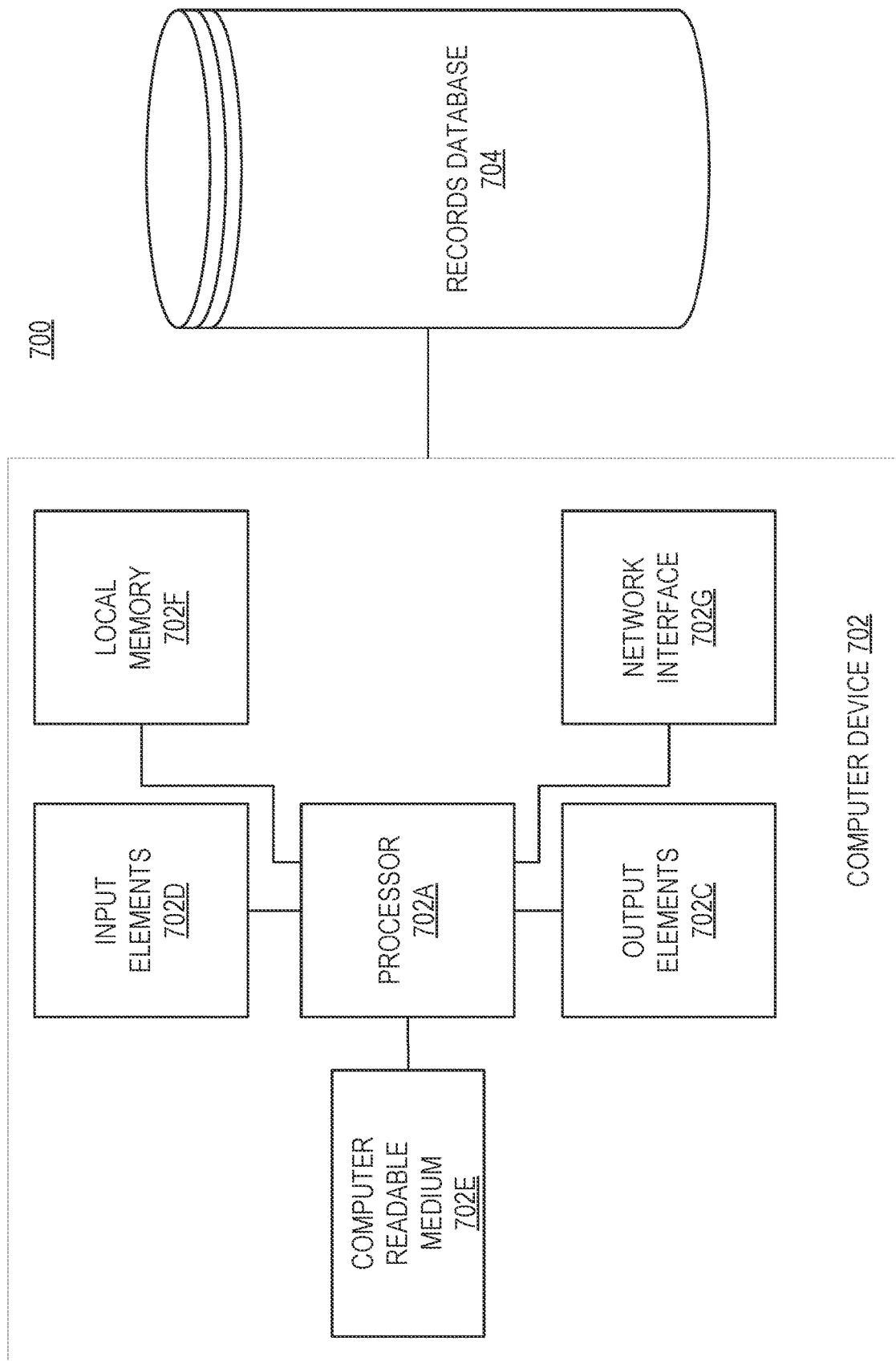
FIG. 7 illustrates exemplary subsystems or components for implementing various participants and elements shown in FIGS. 1-6, in accordance with embodiments of the present application.

FIG. 7 shows a block diagram of a system 700 comprising a number of components according to some embodiments of the invention. The system comprises a computer device 702 in communication with a records database 704. The records database 704 may store a plurality of records and data associated with each one of the plurality of records. According to various embodiments, the records database 704 may be at a remote location compared to the computer device 702. The exemplary computer device 702 may comprise, but is not limited to, a processor 702A, an output element 702C, an input element 702D, a computer readable medium 702E, a local memory 702F, and a network interface 702G.

The output element 702C may comprise any suitable devices that may output data. Examples of output elements 702C may include display screens, speakers, data transmission devices, printing devices, etc. The input element 702D may include any suitable device capable of inputting data into the computer device 702. Examples of input devices include mouse, keyboard, stylus pens, buttons, touchscreens, touch pads, microphones, etc. The local memory 702F may store data saved thereon. For example, the local memory may store the cached parent/child data information described above. The network interface 702G may include an interface that can allow the access device 702 to communicate with external computers or databases, such as the records database 704.

The computer readable medium 702E may comprise code, executable by the processor 702A, to implement a method comprising: receiving a plurality of hierarchical records, wherein each current record in the plurality of hierarchical records includes a parent field, an entry in the parent field identifies a parent record of the current record, wherein the parent record is higher in hierarchy than the current record; identifying one or more records among the plurality of hierarchical records that have no entry in the parent field; adding a phantom apex record to the plurality of hierarchical records; inserting a reference to the phantom apex record for each of the identified one or more records; determining a position for each of the plurality of hierarchical records based on the parent field in each record; deleting all references to the phantom apex record in all of the parent fields; removing the phantom apex record from the plurality of hierarchical records; rendering a shape at each determined position for the plurality of hierarchical records, wherein each shape represents a unique record among the plurality of hierarchical records; and visually connecting the shapes based on entries in the parent fields thereby graphically illustrating the plurality of hierarchical records on a target output medium.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or processing server computer.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for graphically illustrating a plurality of hierarchical records, the method comprising:
   receiving, by a computer device, a user request for a record stored at a database;
   identifying, by the computer device, a first group of hierarchical records associated with the requested record among the plurality of hierarchical records stored at the database in response to the user request, wherein each current record in the plurality of hierarchical records includes a parent field that identifies a parent record of the current record, wherein the parent record is higher in hierarchy than the current record, wherein the first group of hierarchical records consists of a first family of records that includes a first apex record at a highest point in hierarchy with no entry in the parent field of the first apex record, wherein the first group of hierarchical records includes the requested record;
   identifying a second group of hierarchical records among the plurality of hierarchical records as being related to the first group of hierarchical records including a second apex record at the highest point in hierarchy with no entry in the parent field of the second apex record, wherein the second group of hierarchical records includes at least a second family of records;
   creating, by the computer device, a phantom apex record;
   inserting, by the computer device, a reference to the phantom apex record in each of the first apex record and the second apex record;
   determining, by the computer device, a position for each of the plurality of hierarchical records based on the parent field in each record;
   after determining the position for each of the plurality of hierarchical records, deleting, by the computer device, the references to the phantom apex record in the first apex record and the second apex record while storing a second position determined for the phantom apex record;

rendering, by the computer device, a shape at each determined position for the plurality of hierarchical records excluding the phantom apex record to prevent the phantom apex record from being rendered at the second position determined for the phantom apex record, wherein each shape represents a unique record among the plurality of hierarchical records such that the first group of hierarchical records is rendered adjacent to and disconnected from the second group of hierarchical records, the first apex record being rendered at a same level as the second apex record and no shape representing the phantom apex record is rendered at the second position determined for the phantom apex record; and graphically connecting, by the computer device, the shapes based on entries in the parent fields to illustrate the plurality of hierarchical records on a target output medium.

2. The method of claim 1, wherein no record in the first group of hierarchical records is identified by an entry in the parent field of any record in the second group of hierarchical records, and wherein no record in the second group of hierarchical records is identified by an entry in the parent field of any record in the first group of hierarchical records.

3. The method of claim 1, wherein identifying the first group of hierarchical records or the second group of hierarchical records includes:

identifying, by the computer device, a list of records and a hierarchical relationship among the plurality of hierarchical records.

4. The method of claim 1, wherein determining the position for each of the plurality of hierarchical records includes:

determining, by the computer device, an x-y coordinate on the target output medium for rendering the shape at each determined position for each of the plurality of hierarchical records on the target output medium.

5. The method of claim 1, wherein the position for a given record among the plurality of hierarchical records on a first target output medium having a first set of dimensions is different than the position for the given record on a second target output medium having a second set of dimensions, wherein the first target output medium has a different size than the second target output medium.

6. The method of claim 1, wherein the target output medium includes a digital display or a sheet of paper.

7. The method of claim 1, further comprising:

adding or subtracting, by the computer device, a fixed distance from each of the positions in order to move a graphical representation of the plurality of hierarchical records over where the phantom apex record would have been rendered.

8. The method of claim 1, wherein the plurality of hierarchical records are graphically illustrated utilizing a graphical tree.

9. A system comprising:

a processor and a non-transitory computer-readable medium coupled to the processor, the non-transitory computer-readable medium comprising instructions that, when executed by the processor, cause the processor to:

receive a user request for a record stored at a database;

identifying a first group of hierarchical records associated with the requested record among a plurality of hierarchical records stored at the database in response to the user request, wherein each current record in the plurality of hierarchical records includes a parent field that identifies a parent record of the current record, wherein the parent record is higher in hierarchy than the current record, wherein the first group of hierarchical records consists of a first family of records that includes a first apex record at a highest point in hierarchy with no entry in the parent field of the first apex record, wherein the first group of hierarchical records includes the requested record;

identify a second group of hierarchical records among the plurality of hierarchical records as being related to the first group of hierarchical records including a second apex record at the highest point in hierarchy with no entry in the parent field of the second apex record, wherein the second group of hierarchical records includes at least a second family of records;

create a phantom apex record;

insert a reference to the phantom apex record for each of the first apex record and the second apex record;

determine a position for each of the plurality of hierarchical records based on the parent field in each record;

after determining the position for each of the plurality of hierarchical records, delete the references to the phantom apex record in the first apex record and the second apex record while storing a second position determined for the phantom apex record;

render a shape at each determined position for the plurality of hierarchical records excluding the phantom apex record to prevent the phantom apex record from being rendered at the second position determined for the phantom apex record, wherein each shape represents a unique record among the plurality of hierarchical records such that the first group of hierarchical records is rendered adjacent to and disconnected from the second group of hierarchical records, the first apex record being rendered at a same level as the second apex record and no shape representing the phantom apex record is rendered at the second position determined for the phantom apex record; and graphically connect the shapes based on entries in the parent fields to illustrate the plurality of hierarchical records on a target output medium.

10. The system of claim 9, wherein no record in the first group of hierarchical records is identified by an entry in the parent field of any record in the second group of hierarchical records, and wherein no record in the second group of hierarchical records is identified by an entry in the parent field of any record in the first group of hierarchical records.

11. The system of claim 9, wherein identifying the first group or the second group of hierarchical records includes:

identifying a list of records and a hierarchical relationship among the plurality of hierarchical records.

12. The system of claim 9, wherein determining the position for each of the plurality of hierarchical records includes:

determining an x-y coordinate on the target output medium for rendering the shape at each determined position for each of the plurality of hierarchical records on the target output medium.

13. The system of claim 9, wherein the position for a given record among the plurality of hierarchical records on a first target output medium having a first set of dimensions is different than the position for the given record on a second target output medium having a second set of dimensions, wherein the first target output medium has a different size than the second target output medium.

14. The system of claim 9, wherein determining the position for each of the plurality of hierarchical records comprises:
adding or subtracting a fixed distance from each of the positions in order to move graphical representation of the plurality of hierarchical records over where the phantom apex record would have been rendered.

15. A non-transitory computer-readable medium storing instructions that, when executed by a processor, cause the processor to:
receive a user request for a record stored at a database;
identify a first group of hierarchical records associated with the requested record among a plurality of hierarchical records stored at the database in response to the user request, wherein each current record in the plurality of hierarchical records includes a parent field that identifies a parent record of the current record, wherein the parent record is higher in hierarchy than the current record, wherein the first group of hierarchical records consists of a first family of records that includes a first apex record at a highest point in hierarchy with no entry in the parent field of the first apex record, wherein the first group of hierarchical records include the requested record;
identify a second group of hierarchical records among the plurality of hierarchical records as being related to the first group of hierarchical records including a second apex record at the highest point in hierarchy with no entry in the parent field of the second apex record, wherein the second group of hierarchical records includes at least a second family of records;
create a phantom apex record;
insert a reference to the phantom apex record in each of the first apex record and the second apex record;
determine a position for each of the plurality of hierarchical records based on the parent field in each record;
after determining the position for each of the plurality of hierarchical records, delete the references to the phantom apex record in the first apex record and the second apex record while storing a second position determined for the phantom apex record;
render a shape at each determined position for the plurality of hierarchical records excluding the phantom apex record to prevent the phantom apex record from being rendered at the second position determined for the phantom apex record, wherein each shape represents a unique record among the plurality of hierarchical records such that the first group of hierarchical records is rendered adjacent to and disconnected from the second group of hierarchical records, the first apex record being rendered at a same level as the second apex record and no shape representing the phantom apex record is rendered at the second position determined for the phantom apex record; and
graphically connect the shapes based on entries in the parent fields to illustrate the plurality of hierarchical records on a target output medium.

16. The non-transitory computer-readable medium of claim 15, wherein no record in the first group of hierarchical records is identified by an entry in the parent field of any record in the second group of hierarchical records, and wherein no record in the second group of hierarchical records is identified by an entry in the parent field of any record in the first group of hierarchical records.

17. The non-transitory computer-readable medium of claim 15, wherein identifying the first group or the second group of hierarchical records includes:
receiving a list of records and a hierarchical relationship among the plurality of hierarchical records.

18. The non-transitory computer-readable medium of claim 15, wherein determining the position for each of the plurality of hierarchical records includes:
determining an x-y coordinate on the target output medium for rendering the shape at each determined position for each of the plurality of hierarchical records on the target output medium.

19. The non-transitory computer-readable medium of claim 15, wherein the position for a given record among the plurality of hierarchical records on a first target output medium having a first set of dimensions is different than the position for the given record on a second target output medium having a second set of dimensions, wherein the first target output medium has a different size than the second target output medium.

20. The non-transitory computer-readable medium of claim 15, wherein determining the position for each of the plurality of hierarchical records comprises:
adding or subtracting a fixed distance from each of the positions in order to move graphical representation of the plurality of hierarchical records over where the phantom apex record would have been rendered.

* * * * *